United States Patent [19]

Purdy

[11] Patent Number: 4,552,247
[45] Date of Patent: Nov. 12, 1985

[54] DEER STAND

[76] Inventor: Ricky A. Purdy, 716 E. Sixth, DeWitt, Ark. 72042

[21] Appl. No.: 662,450

[22] Filed: Oct. 17, 1984

[51] Int. Cl.$^4$ ............................................. A01M 31/02
[52] U.S. Cl. .................................... 182/116; 182/178; 182/187
[58] Field of Search ............... 182/116, 178, 187, 107, 182/121

[56] References Cited

U.S. PATENT DOCUMENTS

| 2,881,028 | 4/1959 | Baird | 182/116 |
|---|---|---|---|
| 3,057,431 | 10/1962 | George | 182/116 |
| 3,318,415 | 5/1967 | Christie | 182/116 |
| 3,336,999 | 8/1967 | McSwain | 182/151 |
| 3,630,314 | 12/1971 | Bamburg | 182/116 |
| 3,703,939 | 11/1972 | Maxwell | 182/116 |
| 4,061,202 | 12/1977 | Campbell | 182/116 |
| 4,134,474 | 1/1979 | Stavenau | 182/116 |
| 4,246,981 | 1/1981 | Stavenau | 182/116 |
| 4,257,490 | 3/1981 | Bandy | 182/189 |

FOREIGN PATENT DOCUMENTS 307349  8/1903  France .................. 182/116

Primary Examiner—Reinaldo P. Machado
Attorney, Agent, or Firm—Harvey B. Jacobson

[57] ABSTRACT

An upstanding ladder is provided including opposite side stiles and vertically spaced horizontal rungs extending between and interconnecting the stiles. A platform has one marginal portion thereof pivotally mounted from the uppermost rung with the platform being generally horizontally disposed and extending outwardly of one side of the ladder. The stiles project above the ladder and the base ends of a pair of arms are pivotally mounted from the stile upper ends for swinging about horizontal axes paralleling the ladder rungs. The outer free ends of the arms are interconnected by an outwardly opening V-shaped tree trunk embracing brace extending and secured therebetween and seat structure is mounted from and extends between the outer ends of the arms and is spaced outward from the base ends of the arms pivotally mounted from the stile upper ends. A pair of inclined braces are provided and the upper ends of the braces are removably pivotally anchored relative to the outer ends of the arms, the lower ends of the braces are removably pivotally anchored to the stiles at points spaced below the uppermost rung and the mid-portions of the braces are pivotally anchored relative to the platform intermediate the inner and outer marginal portions thereof. Further, the ladder comprises vertically aligned upper and lower telescopingly engaged ladder sections with the platform, arms and braces being mounted from the upper ladder section and the one marginal portion of the platform extending between the stiles being free of portions thereof projecting outwardly of the sides of the stiles remote from the sides thereof outwardly from which the arms project.

8 Claims, 8 Drawing Figures

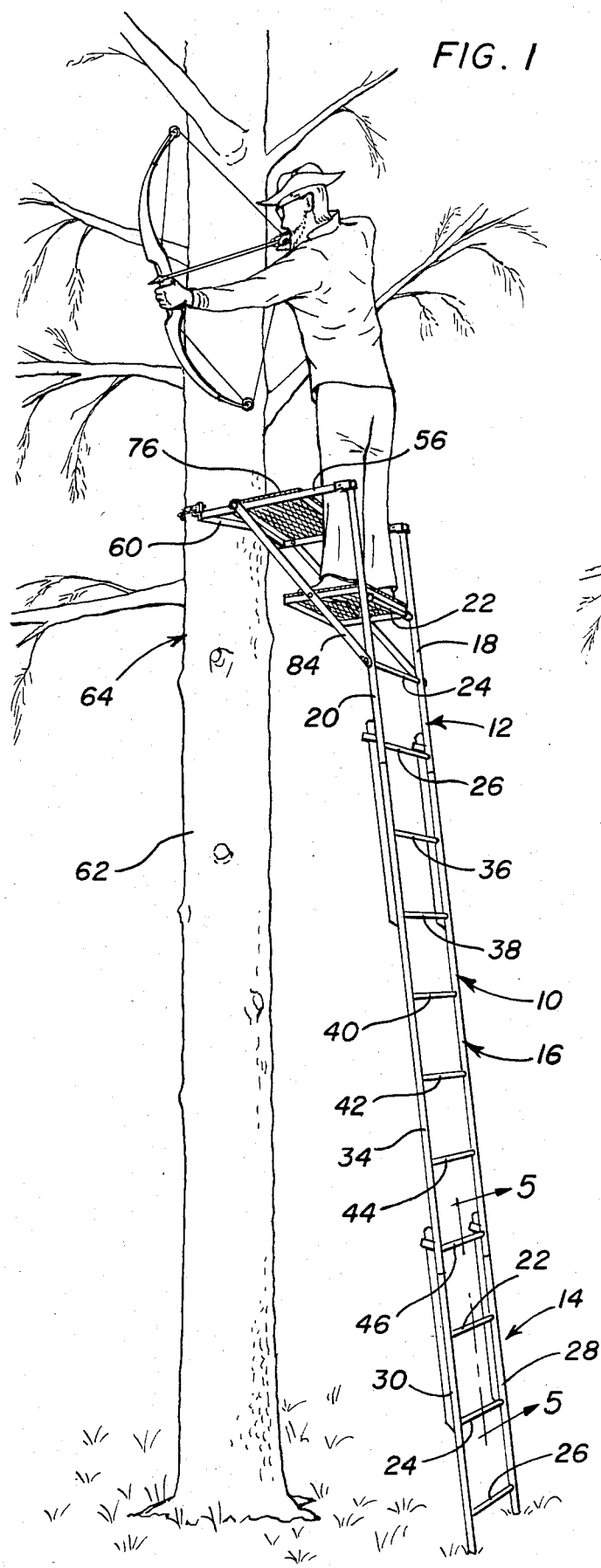
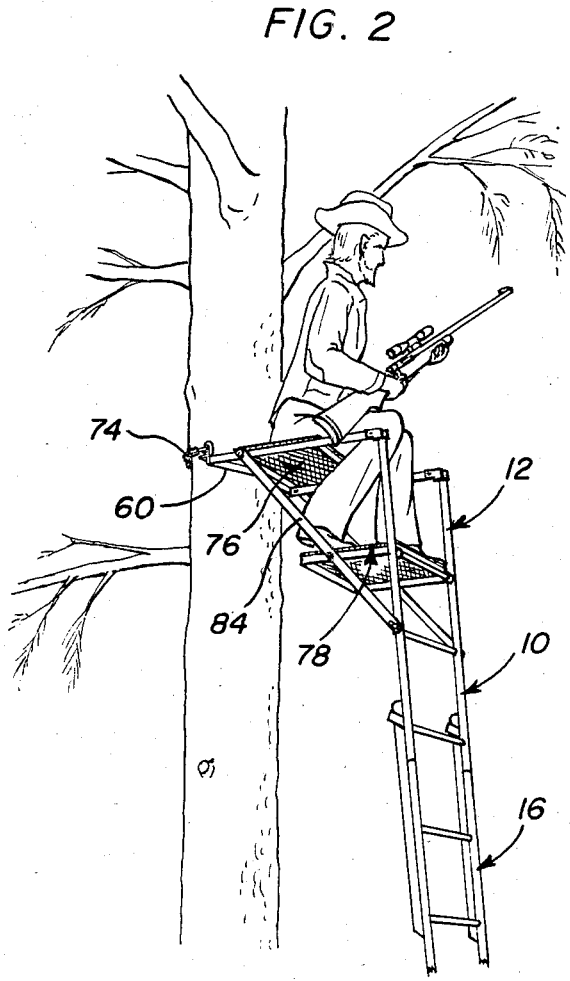
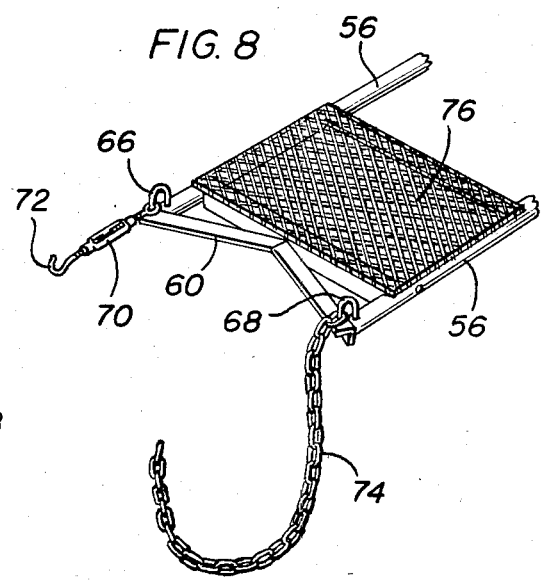

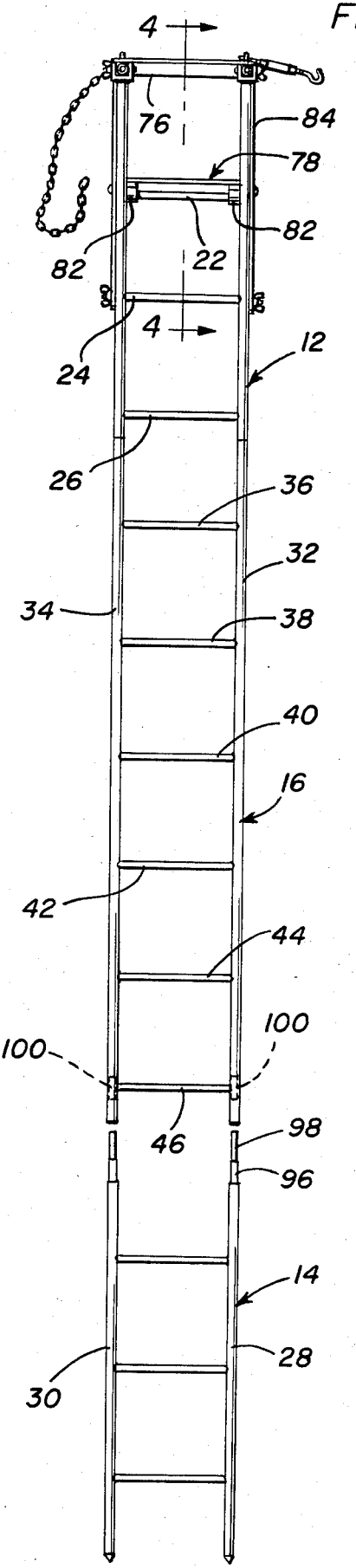
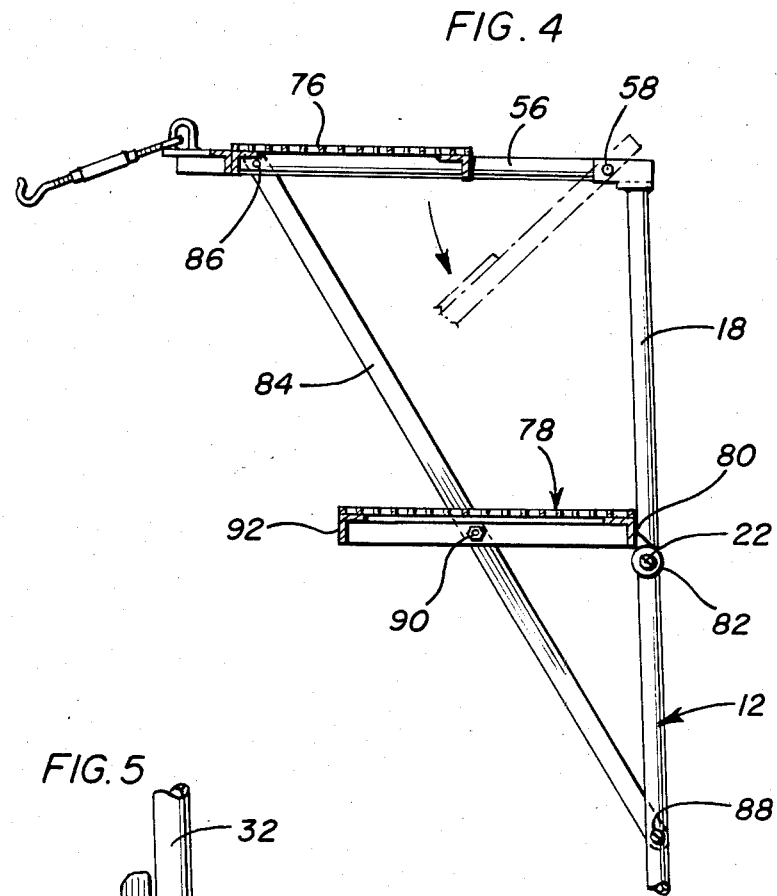
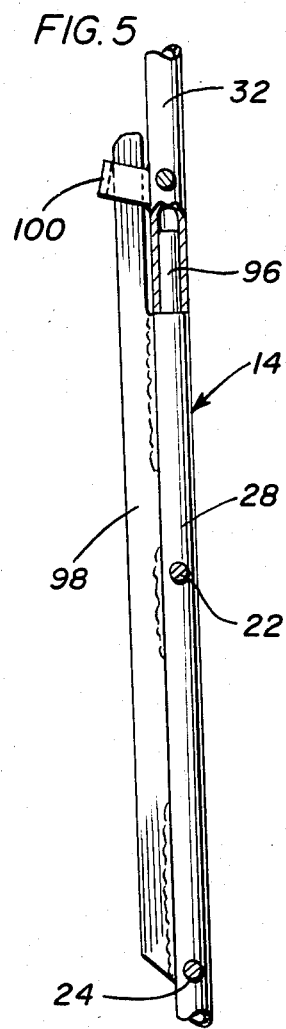
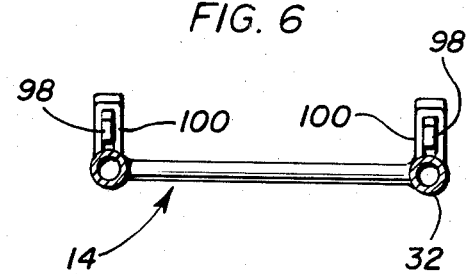
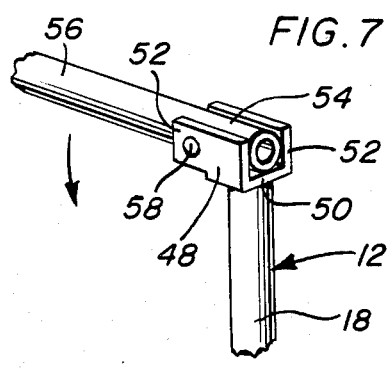

DEER STAND

BACKGROUND OF THE INVENTION

1. Field of the Invention

This invention relates to a collapsible and portable tree or deer stand having an upper platform portion and ladder structure extending downwardly from the platform portion. The tree stand is designed to be leaned against and anchored relative to the trunk of a tree and includes a tree trunk engaging and laterally outwardly projecting seat assembly carried by the uppermost end of the ladder portion of the stand and spaced above the platform. Inclined opposite side braces extend between and interconnect outer end portions of the seat assembly and the platform and also the upper end section of the ladder portion spaced below the platform.

The tree stand is to be used by wildlife observers and hunters as a structure by which such persons may be provided a comfortable support for standing or sitting in an elevated position along a tree trunk. The ladder portion of the stand includes releasably joined ladder sections and the platform, seat structure and inclined braces are foldably collapsible along the upper section of the ladder portion.

2. Description of Related Art

Various different forms of tree stands heretofore have been provided such as those disclosed in U.S. Pat. Nos. 3,057,431, 3,336,999, 3,630,314, 3,703,939, 4,134,474, 4,246,981 and 4,257,490.

However, these previously known forms of tree stands do not include all of the above referred to features of the instant invention and are not as comfortable to the user and as readily transported as the tree stand of the instant invention while maintaining maximum safety features.

SUMMARY OF THE INVENTION

The tree stand of the instant invention includes upper and lower upstanding ladder sections removably joined together in aligned relation with the upper section forming an upper extension of the upper end of the lower section. The upper and lower sections each include opposite side upstanding stiles and vertically spaced rungs extending between and interconnecting the stiles. The upper ladder section includes a standing platform mounted between the stiles thereof below the upper ends of the stiles and spaced generally the same distance above the uppermost rung of the upper section as the uppermost rung is spaced above the next lower rung. One inner marginal portion of the platform extends between the upper section stiles and the platform extends horizontally outwardly of the medial plane of the ladder upper section. The upper end portions of the upper stiles include generally horizontal arms projecting outwardly therefrom spaced above and generally paralleling the platform. The outer ends of the arms are interconnected by bracing structure extending therebetween defining a horizontally outwardly opening tree trunk receiving recess having an innermost limit spaced outwardly of the outer marginal portion of the platform. Seat defining panel structure is supported from and expands the space between the arms and is spaced outward along the arms from the upper ladder section stiles. Opposite side elongated and inclined brace members are provided and include upper ends anchored relative to the outer end portion of the arms, lower ends anchored to the upper ladder section stiles below the platform and intermediate length portions anchored relative to the opposite ends of the outer marginal portion of the platform.

The main object of this invention is to provide a tree stand which may be conveniently carried to a remote location, quickly assembled in operative position and engaged with and secured to a trunk of a tree.

Another object of this invention is to provide a tree stand in accordance with the preceding object and which is of lightweight construction, but which offers several safety features normally not found on tree stands.

Another very important object of this invention is to provide a tree stand which will be very comfortable for a standing or seated person to use.

Another object of this invention is to provide a tree stand which may be used both by hunters and animal observers.

A final object of this invention to be specifically enumerated herein is to provide a tree stand in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the tree stand in operative position relative to a tree and with a hunter standing on the platform portion of the stand;

FIG. 2 is a perspective view of the upper portion of the stand illustrated in FIG. 1 and illustrating the manner in which a hunter may be seated on the seat structure of the stand;

FIG. 3 is an elevational view of the tree stand with the lower ladder section thereof in exploded position;

FIG. 4 is an enlarged fragmentary vertical sectional view taken substantially upon the plane indicated by the section line 4—4 of FIG. 3;

FIG. 5 is an enlarged fragmentary vertical sectional view taken substantially upon the plane indicated by the section line 5—5 of FIG. 1;

FIG. 6 is a top plane view of the assemblage illustrated in FIG. 5;

FIG. 7 is a fragmentary enlarged perspective view of the pivot connection between one of the seat structure supporting arms and the upper end of the associated ladder section stile; and FIG. 8 is a fragmentary perspective view of the tree trunk engaging end of the seat structure portion of the ladder stand.

DETAILED DESCRIPTION OF THE INVENTION

Referring now more specifically to the drawings, the numeral 10 generally designates the tree or deer stand of the instant invention. The stand 10 includes a plurality of upper, lower and intermediate ladder sections referred to in general by the reference numerals 12, 14 and 16. The section 12 includes opposite side stiles 18 and 20 interconnected by vertically spaced rungs 22, 24 and 26 extending and secured between the stiles 18 and 20, the section 14 includes opposite side stiles 28 and 30 interconnected by rungs 22, 24 and 26 extending between and interconnecting the rungs 28 and 30 and the ladder section 16 includes opposite side stiles 32 and 34 interconnected by rungs 36, 38, 40, 42, 44 and 46 extending secured between the stiles 32, 34.

The rung 22 is spaced below the upper ends of the stiles 18 and 20 and the upper ends of the stiles 18 and 20 include upwardly opening horizontal channel members 48 secured thereto by welding. The channel members 48 include lengthwise abbreviated lower bight portions 50 welded to the upper ends of the stiles 18 and 20 and upstanding flanges 52 between which the base ends 54 of a pair of generally horizontal arms 56 are pivotally mounted as at 58. The outer ends of the arms 56 are joined by an outwardly opening V-shaped brace 60 embracingly engaging an upper portion of the trunk 62 of the associated tree referred to in general by the reference numeral 64 and the opposite ends of the brace 60 include anchors 66 and 68 supported therefrom. One end of a turnburckle 70 is pivotally attached to the anchor 66 and includes a hook 72 on its other end. Further, one end of a link chain section 74 is secured to the anchor 68 and the other end of the link chain section 74 is adjustably engageable with the hook 72. The link chain section 74 is adapted to extend about the far side of the tree trunk 62 remote from the side thereof against which the brace 60 is abutted and the turnbuckle 70 may be used to tighten the chain section 74 about the tree trunk 62.

A seat structure 76 is also secured between the outer end portions of the arms 56 immediately inward of the brace 60 and spaced outward from the base ends 54 of the arms 56.

A standing platform referred to in general by the reference numeral 78 is provided and includes a first base marginal portion 80 having aligned sleeves 82 supported therefrom. The sleeves 82 are rotatably engaged with opposite end portions of the rung 22 whereby the platform 78 is pivotally supported from the upper ladder section 12 and a pair of elongated and substantially straight and parallel inclined brace members 84 are removably pivotally connected at their upper ends to the outer end portions of the arms 56 as at 86. The lower ends of the brace members 84 are removably pivotally connected as at 88 to the stiles 18 below the platform 78 and the longitudinal mid-portions of the brack members 84 are pivotally connected as at 90 to the platform 78 centrally intermediate the first base marginal portion 80 thereof and the remote free marginal edge portion 92 thereof. Accordingly, the seat structure and arms 56 as well as the platform 78 may be swung downwardly from the positions thereof illustrated in solid lines in FIG. 4 of the drawings to positions substantially paralleling the stiles 18 and 20 by removal of the removable pivot fasteners 86 and 88, the connections at 58 comprising pivot connections.

The upper ends of the stiles 28 and 30 as well as the upper ends of stiles 32 and 34 include diametrically reduced extensions 96 which are upwardly telescopingly engaged into the lower ends of the stiles 32 and 34 and the stiles 18 and 20 in a manner which is believed to be apparent from FIG. 5 of the drawings and the sides of the stiles 28 and 30 as well as the stiles 32 and 34 corresponding to the side of the tree stand 10 from which the arms 54 and platflorm 78 project include elongated and longitudinally extending bar members 98 secured thereto. The bar members 98 project upwardly beyond the extensions 96 of the corresponding stiles and are upwardly telescoped into stationary sleeves 100 carried by the lower ends of the stiles 18 and 20 as well as the lower ends of the stiles 32 and 34. In this manner, the sections 12, 14 and 16 are releasably joined together to form a single ladder structure capable of supporting considerable weight and highly resistant to twisting and relative angulation between adjacent ladder sections.

When the seat structure 76 and the platform 78 as well as the brace members 84 are folded downwardly along the stiles 18 and 20 and the sections 14 and 16 are disconnected from the section 12, the sections 12, 14 and 16 may be placed in compact juxtaposed positions and secured together for ease in backpacking to and from remote areas.

Because of the manner in which the brace members 84 function as braces between the stiles 18 and 20 and the platform 78 as well as braces between the stiles 18 and 20 and the arms 54 and the novel manner in which the adjacent ends of the sections 12, 14 and 16 are removably telescopingly engaged with each other, the tree stand 10 may be constructed of reasonably lightweight materials and still provide the necessary and desired support with many safety advantages over similar forms of tree stands.

The platform 78 does not project outwardly from the plane in which the rungs 22, 24 and 26 are disposed, except on the side thereof from which the arms 56 project. Accordingly, the user of the stand 10 does not have to climb around the platform 78 in order to ascent the stand 10 to a position disposed upon the platform 78.

Further, the stand 10 may be constructed with the sections 12, 14 and 16 of unitary, non-separable construction. Also, the platform 78, seat 76 and brace members 84 may be semi-permanently joined together against folding of the platform 78 and seat 76 toward positions closely paralleling the section 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An observation stand including upper and lower upstanding ladder sections removably joined together in end aligned relation with the upper section forming an upper extension of the upper end of the lower section, said upper and lower sections each including opposite side upstanding stiles and vertically spaced rungs extending between and interconnecting said stiles, said upper ladder section including a standing platform mounted between the stiles thereof below the upper ends of the stiles and spaced generally the same distance above the next lower rung of the upper section as the last mentioned rung is spaced above the next lower rung, one marginal inner portion of said platform extending between the upper section stiles and said platform extending horizontally outwardly of the medial plane of said upper section, the upper end portions of said upper stiles including generally horizontal arms projecting outwardly therefrom and spaced above and generally paralleling said platform, the outer ends of said arms being interconnected by bracing structure extending therebetween defining a horizontally outwardly opening tree trunk embracing recess having an innermost limit spaced outward of the outer marginal portion of said platform remote from said one marginal portion thereof, seat defining panel structure supported from and spanning the space between said arms and spaced outward along the latter from said upper section stiles, and inclined opposite side and elongated brace members including upper ends anchored relative to the outer end portions of said arms, lower ends anchored to said upper section stiles below said platform and intermediate length portions anchored relative to the opposite ends of the outer marginal portion of said platform, the spacing of said seat defining panel structure outwardly along said arms from the upper section stiles providing an unobstructed vertically extending zone above at least the inner marginal portion of said platform between said arms for receiving the legs of a person standing on said platform, the included angle between said platform and the portions of said upper section stiles below said platform being slightly greater than 90°.

2. The stand of claim 1 wherein said upper and lower ends of said brace menbers are removably pivotally secured to said platform and upper section stiles and the intermediate length portions of said brace members are pivotally anchored to said platform, the base ends of said arms supported from said upper section stiles being pivotally secured thereto and said one inner marginal portion of said platform being pivotally mounted relative to said upper section stiles whereby said arms and platform may be swung to positions extending downwardly along and generally paralleling the stiles of said upper section.

3. The stand of claim 1 wherein the lower ends of the stiles above the lowermost ladder section include means defining opposite side pairs of downwardly opening recesses spaced apart transversely of the medial plane of the corresponding ladder section and the upper ends of the stiles disposed below the uppermost ladder section include opposite side pairs of upwardly projecting extensions snugly telescopingly engaged in the corresponding downwardly opening recesses.

4. The stand of claim 1 wherein said stiles are constructed of cylindrical tubular stock.

5. The stand of claim 1 wherein said recess defined by said bracing structure comprises a V-shaped recess of greater than 90° in angular extent.

6. The stand of claim 1 wherein said upper and lower sections comprise the upper and intermediate sections of a three-section stand including a lowermost ladder section disposed below said lower ladder section.

7. An observation stand including a ladder assembly having opposite side stiles and vertically spaced rungs extending between and interconnecting said stiles, a standing platform mounted from said stiles below the upper ends thereof, one inner marginal portion of said platform extending between said stiles and said platform extending horizontially outwardly of the medial plane of said ladder assembly, the upper end portions of said stiles including generally horizontal arms projecting outwardly therefrom spaced above and generally said platform, the outer ends of said arms being interconnected by bracing structure extending therebetween defining a horizontally outwardly opening tree trunk engaging recess having an innermost limit spaced outward of the outer marginal portion of said platform remote from said one marginal portion thereof, seat defining panel structure supported from and spanning the space between said arms and spaced outward along the ladder from said stiles, inclined opposite side and elongated brace members including upper ends anchored relative to the outer end portions of said arms, lower ends anchored to said stiles below said platform and intermediate portions thereof anchored relative to said platform, said arms and platform being pivotally anchored relative to said stiles for angular displacement about general parallel axes paralleling said rungs and the upper and lower ends of said brace members being removably anchored relative to said arms and stiles and the midportions of said brace members being pivotally anchored relative to said platform whereby said arms, platform and brace members may be swung to positions closely paralleling said stiles.

8. An observation stand including a ladder assembly having opposite side stiles and vertically spaced rungs extending between and interconnecting said stiles, a standing platform mounted from said stiles below the upper ends thereof, one inner marginal portion of said platform extending between said stiles and said platform extending horizontally outwardly of the medial plane of said ladder assembly, the upper end portions of said stiles including generally horizontal arms projecting outwardly therefrom spaced above and generally paralleling said platform, the outer ends of said arms being interconnected by bracing structure extending therebetween defining a horizontally outwardly opening tree trunk engaging recess having an innermost limit spaced outward of the outer marginal portion of said platform remote from said one marginal portion thereof, seat defining panel structure supported from and spanning the space between said arms and spaced outward along the latter from said stiles, inclined opposite side and elongated brace members including upper ends anchored relative to the outer end portions of said arms, lower ends anchored to said stiles below said platform and intermediate portions thereof anchored relative to said platform, said one inner marginal portion of said platform being free of portions thereof projecting outwardly of the sides of said stiles opposite the sides thereof from which said arms project.

* * * * *